United States Patent [19]

Stedman

[11] 4,071,277
[45] Jan. 31, 1978

[54] FORWARD DUMPING TRUCK CONSTRUCTION

[75] Inventor: Robert N. Stedman, Chillicothe, Ill.

[73] Assignee: Caterpillar Tractor Co., Peoria, Ill.

[21] Appl. No.: 665,733

[22] Filed: Mar. 11, 1976

[51] Int. Cl.² .............................................. B60P 1/16
[52] U.S. Cl. .................................... 298/22 P; 180/60;
180/89.1; 280/672; 280/709; 280/713; 296/28 C; 296/28 D; 298/1 C
[58] Field of Search ................. 298/22 R, 22 C, 22 P,
298/1 C, 17.5, 17.6, 17.7; 280/709, 713; 180/54 F, 55, 56, 60, 89 R, 24.07, 24.08, 24 N

[56] References Cited

U.S. PATENT DOCUMENTS

| 2,748,879 | 6/1956 | Bailey | 180/24.07 |
|---|---|---|---|
| 2,752,193 | 6/1956 | Kling | 298/22 |
| 2,855,064 | 10/1958 | McCullough | 180/54 F |
| 3,378,095 | 4/1968 | Sons | 180/75 |
| 3,387,726 | 6/1968 | McKee | 180/89 R |
| 3,552,798 | 1/1971 | Cole | 298/22 P |
| 3,720,446 | 3/1973 | Kelley | 298/22 R |
| 3,768,672 | 10/1973 | Grooss | 214/82 |
| 3,773,348 | 11/1973 | Davis | 280/124 A |

FOREIGN PATENT DOCUMENTS

| 152,868 | 8/1953 | Australia | 180/24.11 |
|---|---|---|---|
| 1,049,716 | 6/1957 | Germany | 298/1 C |

*Primary Examiner*—Trygve M. Blix
*Assistant Examiner*—George F. Abraham
*Attorney, Agent, or Firm*—Phillips, Moore, Weissenberger, Lempio & Majestic

[57] ABSTRACT

A truck comprises a generally U-shaped frame and a dump body pivotally mounted forwardly on the frame and supported on a pair of laterally spaced and parallel side beams thereof. The dump body comprises four triangularly-shaped bottom wall portions converging downwardly to form an inverse pyramidal construction. A double-acting hydraulic cylinder is pivotally interconnected between the frame and dump body to selectively raise the dump body to discharge materials forwardly of the truck. An operator's cab is mounted on a forward end of one of the side beams.

30 Claims, 5 Drawing Figures

FORWARD DUMPING TRUCK CONSTRUCTION

BACKGROUND OF THE INVENTION

This invention relates to a truck of the type adapted for off-highway load carrying and dumping operations.

Conventional trucks employed for off-highway construction operations normally comprise a frame mounted on a plurality of roadwheels and a dump body pivotally mounted on the frame to discharge materials rearwardly of the truck. Such a dumping operation normally requires a "grade spotter" to aid the operator in dumping a load. In addition, many such trucks comprise rather complex frames in the undercarriages thereof to accommodate the dump body in its carry position thereon.

SUMMARY OF THIS INVENTION

An object of this invention is to provide an improved dump truck which is compact in construction, exhibits a low center of gravity and substantially even distribution of weight therealong and which is adapted to expedite the cycle time required for loading and dumping operations.

The truck comprises a frame mounted on a plurality of roadwheels and having a pair of laterally spaced and parallel side beams. A dump body comprises a pair of laterally spaced rails each normally disposed on one of the side beams when the dump body is maintained in its carry position on the frame. The dump body is preferably pivotally mounted forwardly on the frame and actuating means, preferably in the form of at least one double-acting hydraulic cylinder, is pivotally interconnected between the frame and dump body to selectively pivot the dump body towards the forward end of the truck to discharge material thereat.

Another feature of this invention is the disposition of an operator's cab on a forward end of one of the side beams of the frame and in substantial underlying relationship relative to a portion of the material carrying cavity of the dump body. Still another feature of this invention is the inverse pyramidal construction of the bottom portion of the dump body whereby the center of gravity of the truck is inherently placed substantially low in the truck to increase the overall stability thereof. In addition, the dump body is preferably substantially coextensive with the frame and an engine is mounted rearwardly thereon whereby the weight of the truck is substantially evenly distributed throughout its length, both in its empty and loaded conditions of operation.

BRIEF DESCRIPTION OF THE DRAWINGS

Other objects of this invention will become apparent from the following description and accompanying drawings wherein:

FIG. 4 is a partial front elevational view of the truck; and

DETAILED DESCRIPTION

Figure 1:
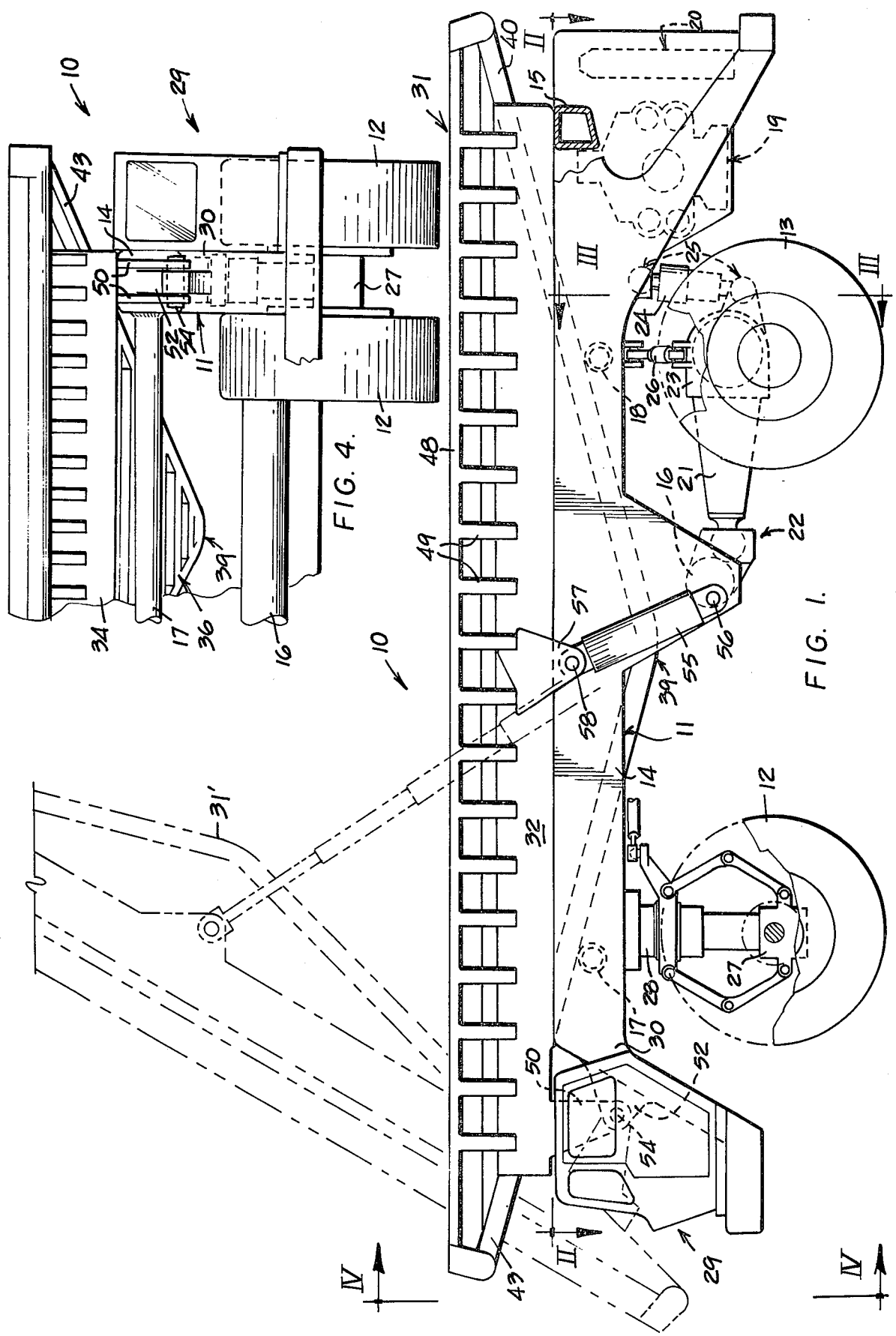
FIG. 1 is a side elevational view of a truck embodying this invention, with a dump body thereof being shown by phantom lines in its raised or dump position of operation.
Figure 2:
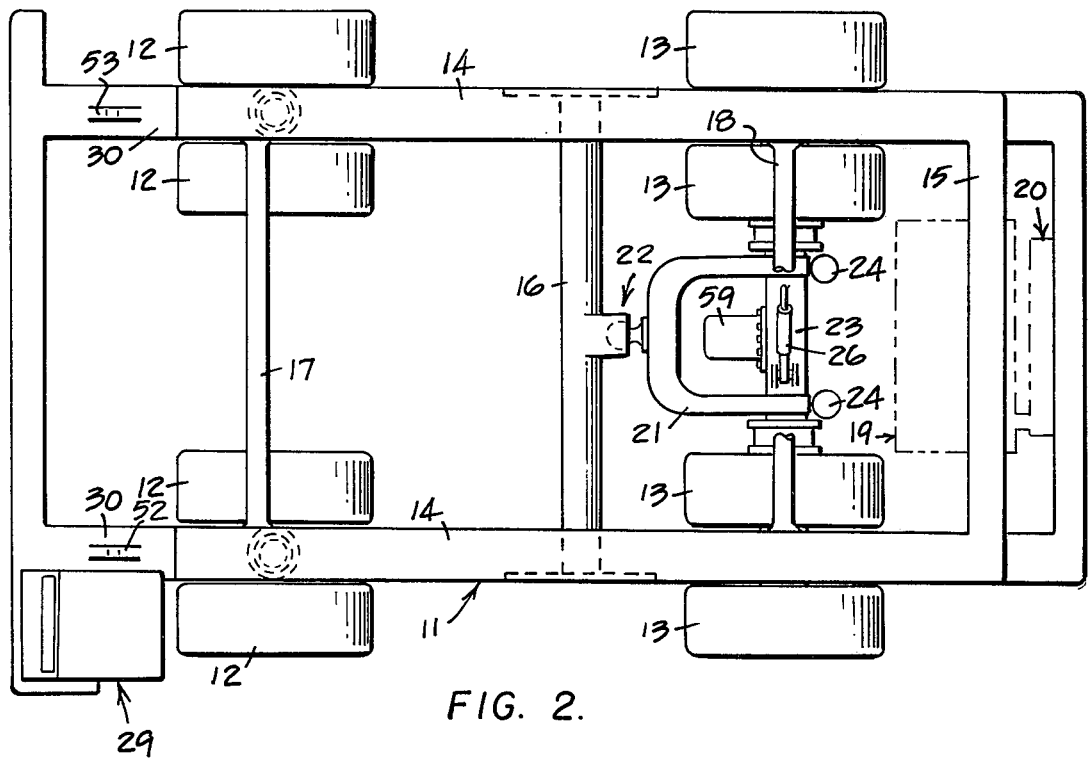
FIG. 2 is a reduced top plan view of the undercarriage of the truck, taken in the direction of arrows II-II in FIG. 1, with the dump body and attendant mechanisms removed for clarification purposes.

FIG. 1 illustrates a truck 10 comprising a main frame 11 mounted on a plurality of front and rear roadwheels 12 and 13, respectively. As shown in FIG. 2, the frame is generally U-shaped to comprise a pair of laterally spaced and parallel side beams 14 and a pair of cross beams 15 and 16 secured between the side beams. The side beams are further secured together by a a pair of longitudinally spaced and laterally extending support members 17 and 18 and the forward end of the frame is open for purposes hereinafter explained.

Figure 3:
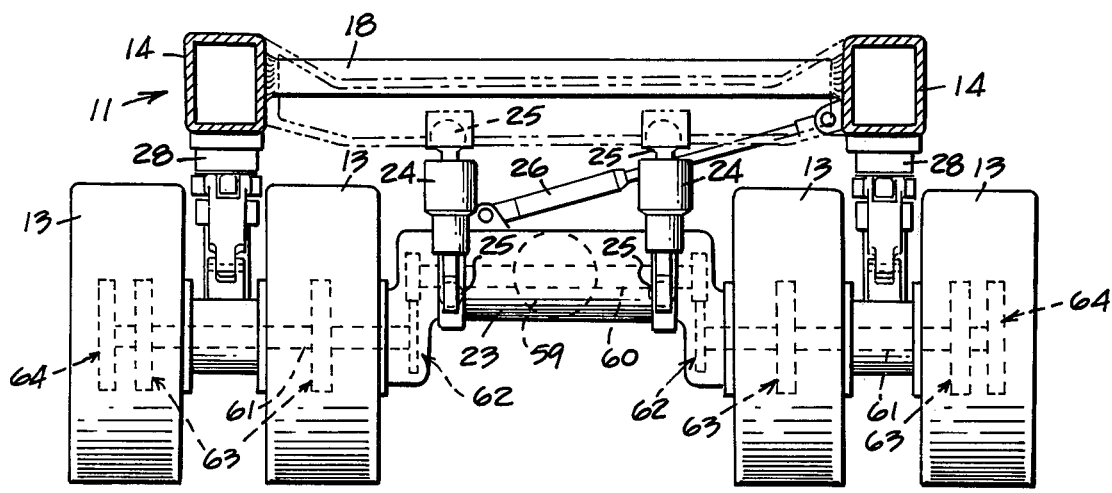
FIG. 3 is a rear elevational view of a rear axle and drive assembly, taken in the direction of arrows III-III in FIG. 1.

An engine 19 is suitably mounted on a rearward end of the frame and disposed transversely thereon, along with an aircooled radiator 20. The engine is suitably connected to rear roadwheels 13 by drive means, hereinafter described, to drive the same to propel the truck. As shown in FIGS. 2 and 3, each pair of rear roadwheels 13 is rotatably mounted on a lever member or U-shaped sub-frame 21 having its forward end universally connected to cross beam 16 by a ball and socket connection 22.

The rearward ends of sub-frame 21 are secured to a rear axle housing 23. The axle housing is suspended beneath main frame 11 by a pair of laterally spaced and conventional suspension cylinders 24. The opposite end of each suspension cylinder is universally connected to the main frame and axle housing by a ball and socket connection 25 and a transversely disposed tag link 26 is pivotally interconnected therebetween.

Each pair of front roadwheels 12 has a common axle housing 27 connected to an underside of side beam 14, for example, by a conventional suspension cylinder 28. The suspension cylinder further functions as a king pin in that it has conventional steering means associated therewith (partially illustrated) for selectively pivoting the roadwheels in a horizontal plane to steer the truck. Such steering means may be of the type disclosed in U.S. Pat. No. 3,565,455, assigned to the assignee of this application.

As shown in FIGS. 1 and 4, an operator's cab 29 is mounted forwardly on the frame and preferably on the forward end and outboard side of a side beam 14. The forward end of the side beam comprises a forward portion 30 which extends downwardly and forwardly to have the operator's cab mounted thereon. Thus, the operator is positioned to have substantially unobstructed visibility forwardly of the vehicle during the hereinafter described dumping operation of the truck.

Figure 5:
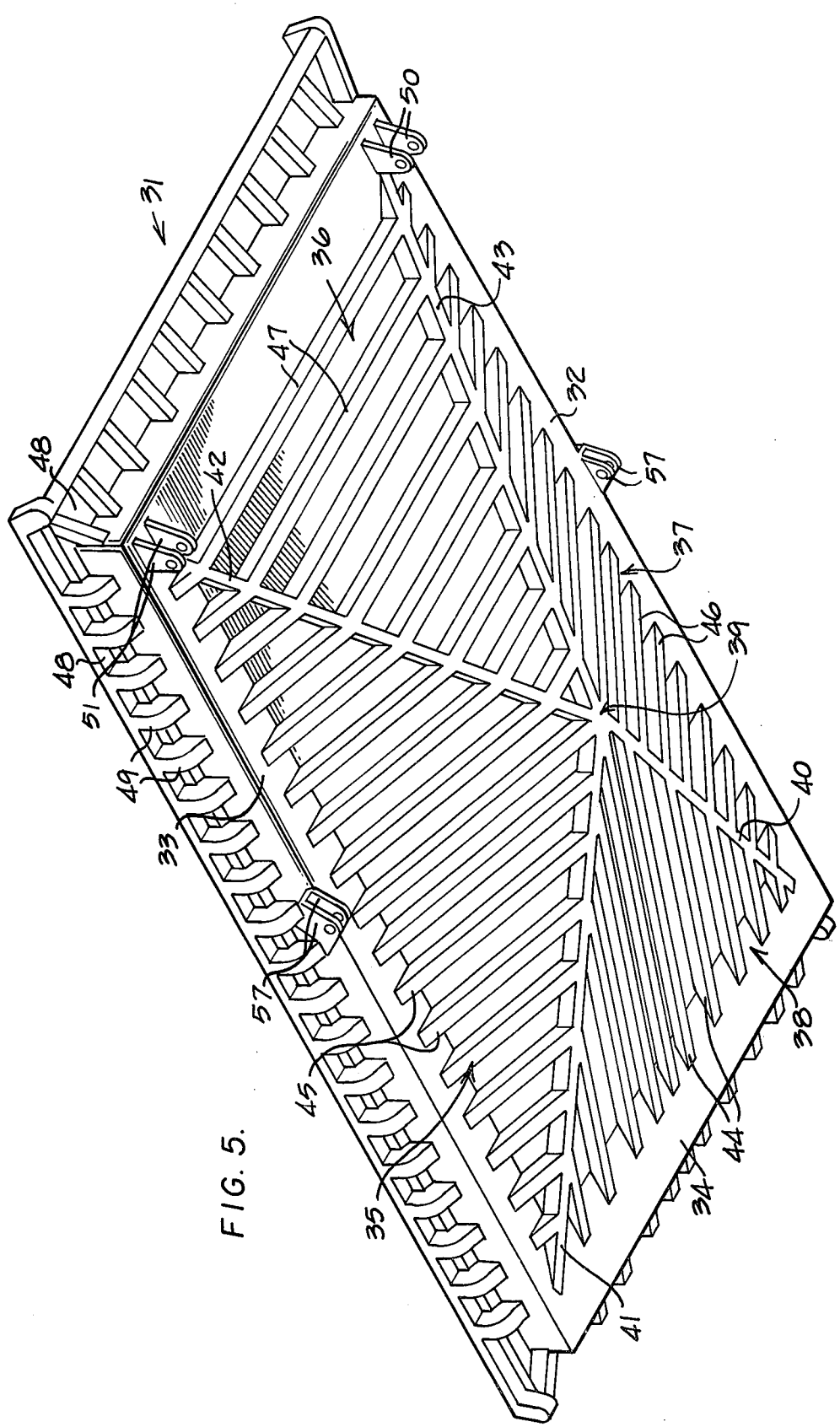
FIG. 5 is a bottom perspective view of the truck's dump body.

FIG. 5 illustrates a dump body 31 comprising a pair of laterally spaced and parallel support rails 32 and 33 normally disposed and supported on side beams 14. A rear cross-rail 34 is secured between the side rails and is adapted to be supported on cross-beam 15 in overlying relationship relative to engine 19 (FIG. 1). The main body portion of the dump body is constructed in an inverse pyramidal shaped configuration to provide four triangularly shaped bottom wall portions 35, 36, 37 and 38 which converge downwardly to meet at an apex 39 thereof. Edges of each pair of adjacent wall portions meet at diagonally disposed reinforcing ribs 40, 41, 42 or 43.

A plurality of longitudinally extending and parallel reinforcing ribs 44 are secured on rear wall portion 38 to extend between support rail 34 and ribs 40 and 41. Sidewall portions 35 and 37 exhibit similar constructions wherein transversely disposed reinforcing ribs 45 and 46, respectively, are formed integrally therewith. Forward wall portion 36 has a plurality of parallel reinforcing ribs 47 formed integrally therewith and orientated in a slightly different manner, i.e., disposed transversely in secured relationship between ribs 42 and 43.

As further shown in FIG. 5, a rectangular skirt 48, at least substantially covering operator's cab 29 along with a portion of a material carrying cavity of the dump body, is formed integrally on the upper peripheral edges of the dump body and reinforced by a plurality of parallel ribs 49. Two pairs of apertured lugs 50 and 51 are secured to the underside of the truck body and disposed at a forward end thereof. As shown in FIGS. 1, 2 and 4, pairs of lugs 50 and 51 are adapted to be pivotally mounted on brackets 52 and 53, respectively, by pins 54 (one shown). Each bracket is secured on portion 30 of a respective side rail to project forwardly therefrom whereby dump body 32 may be pivoted forwardly on the truck to its dump position 31', illustrated by phantom lines in FIG. 1.

The truck body may be pivoted between its carry and dump positions on the frame by actuating means, preferably comprising at least one double-acting hydraulic cylinder 55. The cylinder may be of the telescopic type having its head end pivotally mounted on frame 11 by a pin 56 and its rod end pivotally mounted to a pair of brackets 57, secured on an underside of the truck body, by a pin 58. As shown in FIG. 1, a second pair of brackets 57 are adapted for connection to a second actuating means (not shown) constructed and arranged in a like manner but positioned on an opposite side of the truck from that shown.

Returning to FIGS. 2 and 3 for a brief description of the drive means for rear roadwheels 13, the housing of an electric drive motor 59 is secured on axle housing 23. The output shaft of the motor (not shown) is drivingly connected to a common drive axle 60, rotatably mounted in the axle housing, via standard differential gearing (not shown). Each end of the drive axle is drivingly connected to a wheel drive axle 61 for each pair of rear roadwheels by a gear train and speed reducer constituting a set of spur gears 62.

The electric motor 59 is operatively connected to an electric generator (not shown) and engine 19 (FIG. 1) to thus selectively drive roadwheels 13. If so desired, a standard planetary gear set 63 may be operatively connected in a conventional manner between each drive axle 61 and one or both roadwheels connected thereto to provide a further speed reduction therebetween. In addition, a standard brake package 64 may be suitably integrated in the final wheel drive for each pair of roadwheels to provide selective braking thereof in a conventional manner.

Referring again to FIGS. 1 and 4, it should be noted that a portion of the material carrying cavity of the dump body, defined in part by skirt 48, extends into overlying relationship relative to operator's cab in contrast to conventional truck constructions. Also, an uppermost portion of the cab is disposed no higher in a vertical direction than an uppermost portion of frame 11. In addition, a substantial portion of the frame, including side beams 14 thereof, are vertically disposed above the roadwheels and each pair of the roadwheels are mounted directly beneath such side beams. Although the truck of this invention is particularly adapted for forward dumping, it should be understood that the latter features, and others discussed above, are also adapted for use on rearward, sideward or bottom dumping truck applications.

What is claimed is:

1. A truck comprising
   a frame mounted on a plurality of roadwheels and including a pair of laterally spaced and parallel side beams,
   an operator's cab mounted forwardly on said frame, a dump body comprising a pair of laterally spaced and parallel support rails each normally disposed on a respective one of said side beams when said dump body is horizontally disposed and maintained in a carry position on said frame and four triangularly shaped bottom wall portions converging downwardly to meet at apexes thereof disposed below said side beams to form an inverse pyramidal construction.

2. The truck of claim 1 wherein said pivot means pivotally mounts said dump body on each one of said side beams.

3. The truck of claim 2 wherein each of said side beams comprises a forward portion extending forwardly and downwardly and wherein said pivot means pivotally mounts said dump body on the forward portion of each of said side beams.

4. The truck of claim 1 wherein a forward portion of one of said side beams extends forwardly and downwardly and wherein said operator's cab is mounted on said forward portion.

5. The truck of claim 4 wherein said operator's cab is at least substantially covered by peripheral portions of said dump body.

6. The truck of claim 1 wherein an engine is mounted on a rearward end of said frame in underlying relationship relative to said dump body.

7. The truck of claim 1 further comprising a cross-beam secured between said side beams and sub-frame pivotally connected to said cross-beam, at least one pair of laterally spaced rear roadwheels disposed rearwardly of said actuating means and rotatably mounted on said sub-frame.

8. The truck of claim 7 wherein said sub-frame is pivotally connected to said cross-beam by a single ball and socket connection and further comprising suspension cylinders each pivotally interconnected between a rearward end of said sub-frame and a respective one of said side beams.

9. The truck of claim 1 wherein said roadwheels comprise at least one pair of laterally spaced front roadwheels disposed beneath and mounted on a forward end of each of said side beams.

10. The truck of claim 9 wherein a combined suspension and steering cylinder means is secured to each of said side beams and rotatably mounts at least one front roadwheel on a lower end thereof.

11. The truck of claim 1 wherein said dump body is substantially coextensive longitudinally relative to said frame.

12. The truck of claim 1 wherein each adjacent pair of adjacent bottom wall portions meet at a diagonally disposed reinforcing rib extending along common edges thereof.

13. The truck of claim 12 further comprising additional reinforcing ribs secured to an underside of each of said bottom wall portions and disposed in parallel and spaced relationship relative to each other.

14. The truck of claim 13 further comprising a rectangular skirt secured on upper peripheral edges of said dump body.

15. The truck of claim 1 further comprising a pair of longitudinally spaced support members secured transversely between said side beams and having said dump body supported thereon.

16. The truck of claim 1 further comprising a sub-frame pivotally connected at a forward end thereof to said main frame and secured at a rearward end thereof to an axle housing, said roadwheels comprising at least one pair of laterally spaced roadwheels rotatably mounted on outboard ends of said axle housing.

17. The truck of claim 16 further comprising a pair of laterally spaced suspension cylinders each pivotally interconnected between said axle housing and a respective one of said side beams.

18. The truck of claim 17 further comprising a tag link at least generally disposed in alignment with said axle housing and pivotally interconnected between said axle housing and said main frame.

19. The truck of claim 16 further comprising a drive motor mounted on said axle housing and drive means interconnecting said drive motor and said rear roadwheels for selectively rotating the same.

20. The truck of claim 19 wherein said drive means sequentially comprises a common drive axle, a gear train connected to said drive axle and a wheel drive axle connected to said gear train and to each of said rear roadwheels.

21. A truck comprising
a frame mounted on a plurality of roadwheels and including a pair of laterally spaced and parallel side beams,
an operator's cab mounted on one end of said frame, and
a dump body defining a material carrying cavity therein and comprising a pair of laterally spaced and parallel support rails each normally disposed on a respective one of said side beams when said dump body is horizontally disposed and maintained in a carry position on said frame, said dump body being substantially co-extensive with respect to said frame and a portion of the material carrying cavity thereof extending into overlying relationship with respect to said operator's cab.

22. The truck of claim 21 further comprising pivot means pivotally mounting said dump body on said frame and actuating means pivotally interconnected between said frame and said dump body for selectively pivoting said dump body about said pivot means from its carry position to a raised dump position whereby material carried in said dump body can be discharged therefrom.

23. The truck of claim 21 wherein a substantial portion of said frame, including the side beams thereof, are disposed vertically above said roadwheels.

24. The truck of claim 21 wherein an uppermost portion of said operator's cab is disposed no higher in a vertical direction than an uppermost portion of said frame.

25. The truck of claim 21 wherein the periphery of said dump body fully overlies and is at least substantially co-incident with respect to said frame and said roadwheels.

26. The truck of claim 21 wherein an engine is mounted transversely on a rearward end of said frame in underlying relatonship relative to said dump body.

27. The truck of claim 21 wherein said roadwheels comprise at least two pairs of laterally spaced front roadwheels and two pairs of laterally spaced rear roadwheels with each such pair of roadwheels being mounted directly beneath one of said side beams.

28. The truck of claim 21 wherein said dump body is symmetrically formed to comprise four triangularly shaped bottom wall portions converging downwardly to meet at apexes thereof disposed below said side beams to form an inverse pyramidal construction.

29. A truck comprising
a frame mounted on a plurality of roadwheels and including a pair of laterally spaced and parallel side beams,
an operator's cab mounted forwardly on said frame,
a dump body comprising a pair of laterally spaced and parallel support rails each normally disposed on a respective one of said side beams when said dump body is horizontally disposed and maintained in a carry position on said frame,
pivot means pivotally mounting said dump body forwardly on said frame,
actuating means pivotally interconnected between said frame and said dump body for selectively pivoting said dump body about said pivot means and towards a forward end of said truck from its carry position to a raised dump position whereby material carried in said dump body can be discharged forwardly of said truck,
a sub-frame pivotally connected at a forward end thereof to said main frame and secured at a rearward end thereof to an axle housing, said roadwheels comprising at least one pair of laterally spaced roadwheels rotatably mounted on outboard ends of said axle housing,
a pair of laterally spaced suspension cylinders each pivotally interconnected between said axle housing and a respective one of said side beams, and
a tag link at least generally disposed in alignment with said axle housing and pivotally interconnected between said axle housing and said main frame.

30. A truck comprising
a frame mounted on a plurality of roadwheels and including a pair of laterally spaced and parallel side beams,
an operator's cab mounted forwardly on said frame,
a dump body comprising a pair of laterally spaced and parallel support rails each normally disposed on a respective one of said side beams when said dump body is horizontally disposed and maintained in a carry position on said frame,
pivot means pivotally mounting said dump body forwardly on said frame, and
actuating means pivotally interconnected between said frame and said dump body for selectively pivoting said dump body about said pivot means and towards a forward end of said truck from its carry position to a raised dump position whereby material carried in said dump body can be discharged forwardly of said truck,
a sub-frame pivotally connected at a forward end thereof to said main frame and secured at rearward end thereof to an axle housing, said roadwheels comprising at least one pair of laterally spaced roadwheels rotatably mounted on outboard ends of said axle housing which extends therebetween, and
a single drive motor mounted on said axle housing intermediate said last-mentioned roadwheels and drive means interconnecting said drive motor and said rear roadwheels for selectively rotating the same.

* * * * *